C. & A. SPRING.
Velocipede.
No. 90,601.  Patented May 25, 1869.
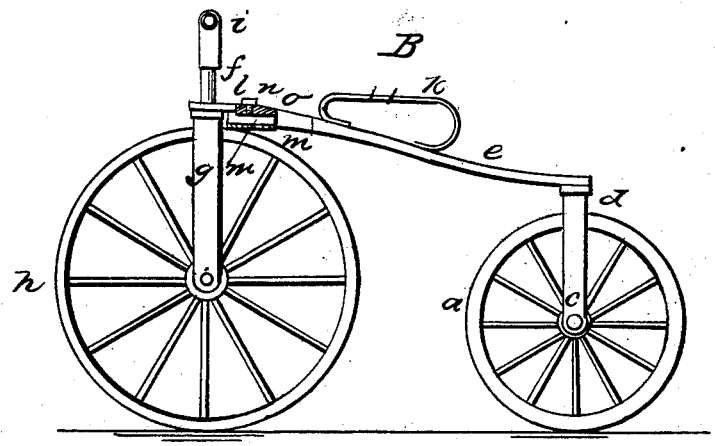
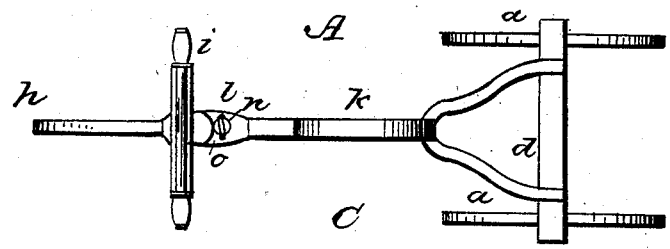
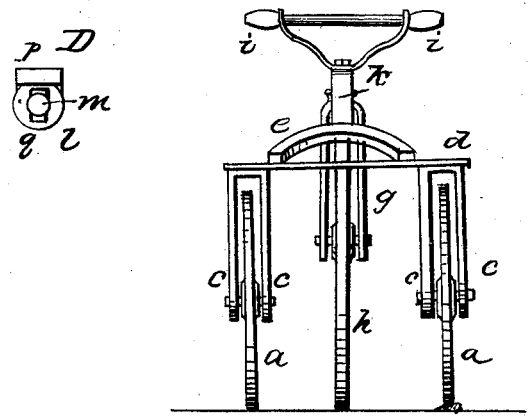

United States Patent Office.

CHARLES SPRING, OF HYDE PARK, AND ANDREW SPRING, OF WESTON, MASSACHUSETTS.

Letters Patent No. 90,601, dated May 25, 1869.

IMPROVED VELOCIPEDE.

The Schedule referred to in these Letters Patent and making part of the same.

*To all whom it may concern:*

Be it known that we, CHARLES SPRING, of Hyde Park, Norfolk county, and ANDREW SPRING, of Weston, Middlesex county, all in the State of Massachusetts, have invented an Improvement in Velocipedes; and we do hereby declare that the following, taken in connection with the drawings which accompany and form part of this specification, is a description of our invention sufficient to enable those skilled in the art to practise it.

In three-wheeled velocipedes, and to some extent in "four-wheelers," much difficulty arises in riding them, from the fact that if one of the side wheels strikes an obstruction the vehicle is overturned, for, as the wheels or wheel-axles are connected by a jointless frame, a tipping-movement of either wheel is instantly communicated to the whole carriage, and generally tips over the vehicle.

Our invention has reference to provision for obviating this difficulty, and we accomplish this object by jointing one part of the frame, or perch, relatively to the other part thereof, as hereinafter described, so that the front and rear wheels can have a slight relative tipping-movement.

It is in this construction that our invention consists.

The drawings represent a velocipede embodying the improvement.

A shows a plan of the vehicle;
B, a side elevation; and
C, an end elevation of it.

*a a* denote the pair of hind wheels, the axles, or journals of which turn in bearings, *c*, connected by a transom-bar, *d*, to which the forked end of a perch, *e*, is fixed, the other end of such perch serving as the bearing for the vertical steering-axle *f*, from which depends the fork *g*, in which is journalled the axis of the front wheel, *h*, the top of the axle carrying the guiding-handles, *i*, and the top of the perch carrying the saddle, *k*, as in other velocipedes.

The front piece *l*, of the perch, is jointed to the main bar *e*, this piece *l* being formed tubular, as seen at D, and having running through it a long axle-pin, *m*, projecting from the front of the main perch-bar.

The axle-pin *m* turns freely in the sleeve, in either direction, and the extent of its relative movement in either direction may be limited by a pin, *n*, and a slot, *o*, in the sleeve, through which slot the pin projects.

Now it will readily be seen, that if either rear wheel strikes a stone or other small obstruction, the consequent tipping-movement of such wheel will not be communicated to the front wheel, but will be imparted only to the rear wheels and the part of the perch rigidly connected thereto. For this reason, the vehicle will not be tipped over by such obstruction.

By turning up the screw-pin *o*, the sleeve and axle-pin may be confined so as to be relatively immovable.

It will be obvious that the joint may be placed in rear of the saddle, instead of in front of the same, and may be applied to four-wheeled velocipedes, as well as to "three-wheelers," and in any manner such that the connected wheels at either end may have a tipping-movement relatively to the wheels at the opposite end of the vehicle.

The perch of a common four-wheeled road-carriage may be jointed on the same principle, and by having a tongue, *p*, on one side of the sleeve, as seen at D, and a groove, *q*, in the opposite side of the sleeve, (which groove extends through the length of the sleeve,) the parts may be readily disconnected, or will readily disconnect when the tongue and groove come into line.

When the two parts of the perch are connected for use, as shown, by the insertion of one part into the sleeve of the other, it will be seen that the tongue is so located, relatively to the groove, as not to permit the two parts to separate; but, on the contrary, the tongue is then beyond the end of the sleeve, and not in line with the groove, and consequently it abuts against the end of the sleeve, and thus forms a positive lock, uniting the parts of the perch against any accidental separation from each other, and there is no need, therefore, of bolts, screw-threads, or nuts to keep the parts together.

We claim, in a jointed perch, a grooved sleeve, or tube, on one part, and a tongued spindle on the other, these parts being constructed substantially as described, so that, when connected ready for use, they shall be self-locked by means of the tongue.

Also, the above, in combination with the pin and slot, to allow a determined extent of rotative tipping, substantially as shown and set forth.

CHARLES SPRING.
ANDREW SPRING.

Witnesses:
J. B. CROSBY,
FRANCIS GOULD.